(12) United States Patent
Khlestkin et al.

(10) Patent No.: US 10,351,761 B2
(45) Date of Patent: Jul. 16, 2019

(54) METHOD FOR MODIFICATION AND DELIVERY OF PROPPANT DURING WELL OPERATIONS, METHOD FOR HYDRAULIC FRACTURING AND METHOD FOR GRAVEL PACKING

(71) Applicant: SCHLUMBERGER TECHNOLOGY CORPORATION, Sugar Land, TX (US)

(72) Inventors: Vadim Kamil'evich Khlestkin, Novosibirsk (RU); Christopher Fredd, Westfield, NY (US); Bruno Lecerf, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 84 days.

(21) Appl. No.: 15/300,059

(22) PCT Filed: Mar. 31, 2014

(86) PCT No.: PCT/RU2014/000234
§ 371 (c)(1),
(2) Date: Sep. 28, 2016

(87) PCT Pub. No.: WO2015/152756
PCT Pub. Date: Oct. 8, 2015

(65) Prior Publication Data
US 2017/0137702 A1    May 18, 2017

(51) Int. Cl.
*E21B 43/267* (2006.01)
*E21B 43/26* (2006.01)
(Continued)

(52) U.S. Cl.
CPC ............... *C09K 8/805* (2013.01); *C09K 8/62* (2013.01); *C09K 8/703* (2013.01); *C09K 8/94* (2013.01);
(Continued)

(58) Field of Classification Search
CPC ........ E21B 43/267; E21B 43/26; E21B 43/04; C09K 8/68; C09K 8/62; C09K 8/80
See application file for complete search history.

(56) References Cited

U.S. PATENT DOCUMENTS 6,776,235 B1    8/2004  England
7,178,596 B2    2/2007  Blauch et al.
(Continued)

FOREIGN PATENT DOCUMENTS

GB    2433067 A       6/2007
WO    2004009956 A1   1/2004
(Continued)

OTHER PUBLICATIONS

Syed et al., "High-Productivity Horizontal Gravel Packs", Oilfield Review, Summer 2001, pp. 52-73.
(Continued)

*Primary Examiner* — Catherine Loikith

(57) ABSTRACT

The method allows employing proppant surface modification with the emulsified treatment material for proppant delivery deep into far-field fracture zone during operations of hydraulic fracturing or heterogeneous proppant placement via proppant aggregation. In the case of gravel packing operations, to maintain the circulation of the proppant slurry for homogeneous proppant settling to the desired wellbore location. The emulsified treatment material can be degradable of non-degradable in downhole conditions.

30 Claims, 3 Drawing Sheets

(51) Int. Cl.
*E21B 43/04* (2006.01)
*C09K 8/62* (2006.01)
*C09K 8/80* (2006.01)
*C09K 8/70* (2006.01)
*C09K 8/94* (2006.01)

(52) U.S. Cl.
CPC .............. *E21B 43/04* (2013.01); *E21B 43/26* (2013.01); *E21B 43/267* (2013.01); *C09K 2208/08* (2013.01); *C09K 2208/30* (2013.01)

(56) References Cited

U.S. PATENT DOCUMENTS

| | | |
|---|---|---|
| 7,261,157 B2 | 8/2007 | Nguyen et al. |
| 7,451,812 B2 | 11/2008 | Cooper et al. |
| 8,513,311 B2 | 8/2013 | Sagalowicz et al. |
| 2007/0298977 A1 | 12/2007 | Mang et al. |
| 2008/0135242 A1 | 6/2008 | Lesko et al. |
| 2012/0048549 A1 | 3/2012 | Willberg et al. |
| 2013/0161003 A1 | 6/2013 | Makarychev-Mikhailov et al. |

FOREIGN PATENT DOCUMENTS

| | | |
|---|---|---|
| WO | 2007086771 A1 | 8/2007 |
| WO | 2008062332 A2 | 5/2008 |
| WO | 2008068645 A1 | 6/2008 |
| WO | 2010021563 A1 | 2/2010 |
| WO | 2010087733 A1 | 8/2010 |
| WO | 2013070585 A1 | 5/2013 |
| WO | 2013158308 A1 | 10/2013 |

OTHER PUBLICATIONS

Mahrer, "A review and perspective on far-field hydraulic fracture geometry studies", J.Petr.Sci.Eng., No. 24, 1999, pp. 13-28.

Mahrer et al., "Far-Field Hydraulic Fracture Geometry: A Changing Paradigm", SPE 36441, 1996 SPE Annual Technical Conference and Exhibition, Denver, Coloroado, Oct. 6-9, 1996, 14 pages.

Wood et al., "Ultra-Lightweight Proppant Development Yields Exciting New Opportunities in Hydraulic Fracturing Design", SPE 84309, SPE Annual Technical Conference and Exhibition, Denver, Colorado, Oct. 5-8, 2003, 19 pages.

METHOD FOR MODIFICATION AND DELIVERY OF PROPPANT DURING WELL OPERATIONS, METHOD FOR HYDRAULIC FRACTURING AND METHOD FOR GRAVEL PACKING

FIELD OF THE DISCLOSURE

This disclosure is applicable in the oil and gas industry and relates to the techniques of modification and delivery of proppants during well operations employed, in particular, for hydraulic fracturing or gravel packing. More particularly, this disclosure relates to the methods for proppant surface modification and its delivery by means of the emulsified treatment material, for example, into far-field hydraulic fracture areas through branching extended fractures or fractures in layered and complicated formations.

BACKGROUND

Hydraulic fracturing is a complex process that involves many mechanisms; treatment procedures are affected by both natural and man-made conditions. The methods for wellbore completion (e.g. drilled, cemented, and perforated wellbores) have a strong influence on the fracture initiation and subsequent propagation. The fracture initiation and near-wellbore propagation contribute strongly to fracture configuration in far-field zone. (Here we define the far-field as a distance greater than 30 m from the wellbore). Reservoir porosity, permeability, saturation, and native pore fluid also influence the hydraulic fracturing results. In addition, formation heterogeneities, natural pre-existing fractures, joints, strata, etc. and the stress pattern are also the contributing factors. The actual far-field hydraulic fracture geometry is rather different from the simplified picture of a single bi-wing planar hydraulic fracture. This has been demonstrated by many data sets, including (1) core analysis; (2) mineback experiments, for example, experiments in coal formations, in which investigators mined into the formation after performing a hydraulic fracturing treatment to observe the actual fracture geometry and proppant placement; (3) microseismic tests; (4) wellbore video; (5) treatment pressure response; and (6) surface tilt meter measurements. Direct experimental data were complemented by the results of laboratory simulations, studies of natural hydraulic fracture analogues, and results from computer simulations. The single planar far-field fracture paradigm finds its roots and development in early theory and simplified laboratory studies that were predisposed to single, planar fracture geometry.

It is evident that proppant delivery to multiple branches, especially to the tips of branches, of a far-field fracture network can be improved by special techniques, for example, through ultra lightweight proppants delivery. There is a necessity for a simple and low-cost method for improving proppant suspension in a carrier fluid without the use of high-viscosity fluids. Here we describe such an improvement, namely, the reduction of the proppant settling rate during delivery to the far-field fracture network areas.

SUMMARY

In some embodiments, the present disclosure relates a method for proppant surface modification during well operations. The method comprises: (a) emulsification of treatment material to produce water-based emulsion; (b) forming the proppant slurry including the proppant, droplets of the internal phase of the emulsion containing the dissolved treatment material, and the carrier fluid, wherein the emulsified treatment material is partially fixed on at least some proppant particles; and (c) injection of the formed proppant slurry through the well into the formation during the hydraulic fracturing operation and/or during the creation of gravel packing in the wellbore.

In some embodiments, the present disclosure relates a method for proppant delivery into a subterranean formation. The method comprises: (a) proppant surface modification during well operations according to any of claims 1-24; and (b) injection of the formed proppant slurry according to any of claims 1-24 through the well into the formation at pressures and fracturing fluid flow rates providing the delivery of the proppant particles into a hydraulic fracture and/or gravel packing in the wellbore.

In some embodiments, the present disclosure relates a hydraulic fracturing method. The method comprises: (a) emulsification of treatment material to produce water-based emulsion; (b) formation of proppant slurry including the proppant, droplets of the internal phase of the emulsion containing the dissolved treatment material, and the carrier fluid, wherein the emulsified treatment material is partially fixed on at least some proppant particles; (c) injection of the formed proppant slurry through the well into the formation; and (d) contact of a subterranean formation with the fracturing fluid to create or increase at least one subterranean formation fracture.

In some embodiments, the present disclosure relates a gravel packing method. The method comprises: (a) emulsification of treatment material to produce water emulsion; (b) formation of proppant slurry including the proppant, droplets of the internal phase of the emulsion containing the dissolved treatment material, and the carrier fluid, wherein the emulsified treatment material is partially fixed on at least some proppant particles; and (c) injection of the formed proppant slurry through the wellbore to form gravel packing.

BRIEF DESCRIPTION OF THE DRAWINGS

The essence of this disclosure is shown in FIGS. 1-5.

DETAILED DESCRIPTION

Figure 1:
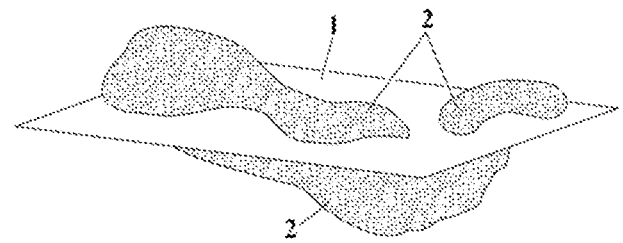
FIG. 1 shows a plate-like proppant particle partially coated with a material precipitated from the emulsion droplets.

Although the following description mainly emphasises far-field hydraulic fracturing, the slurry of the proppant and emulsion as described herein may be used in other hydraulic fracturing operations, as proppant or as a material for gravel packing. In some situations, the hydraulic fracturing and gravel packing processes are combined into a single operation thus achieving stimulated production and annular gravel packing to reduce the sand flowback. Such operations are often called "frac-pack" operations.

The disclosure is equally applicable to wells of any orientation. Nevertheless, gravel packing formation operations using the described method are more applicable for directional and horizontal wells, which experience the problem of delivering solid particles to the remote wellbore location.

In the currently existing technologies of placing a gravel packing in horizontal well sections, the technology recommends to maintain the proppant slurry circulation in low-viscosity brine fluid; the goal o circulation is achieving uniform proppant (as a rule, fine-grade sand) settling in the upper and lower parts of the annular space. Therefore, slower settling of the slurry helps to reach the target. Technology of proppant packing formation in long sections of open wellbores is described in [Oilfield Review, Summer 2001, pp. 52-73].

The disclosure may be described for hydrocarbon production wells (including gas, oil, and condensate), but it is to be understood that the disclosure may be used for wells completed for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

The disclosure describes a method for far-field proppant delivery by means of the interaction of the fine-mesh proppant and/or other particles with an emulsion of the treatment material in the fracturing fluid. The proppant may be ordinary proppant, ground quartz or zeolite powder, talc, mica, fly ash, or other solid substances transportable by the fluid flow far into the fracture. The emulsion may contain dissolved polymers or other materials in emulsified form with or without solvents. The emulsion interacts with the surface of the proppant or other particles with or without emulsion inversion. The inversion of emulsion (emulsion triggering) may occur due to the contact of emulsion with the proppant surface or due to temperature, shear, or chemical triggering, for example, a change in pH of fluid. The enhanced transport of the proppant particles (i.e., reduced settling rate of particles in the slurry) resulting from the settling of the polymer or another material (for example, bitumen) offers improved proppant transport deep into the fracture, thus providing far-field area treatment deeper than about 30 m from the wellbore. Also, enhanced floatation, increased particle-particle interaction, particle network formation, or other phenomena (reducing the settling rate of the proppant in the fracturing fluid) may be brought about by, for example, causing particles other than the proppant (for example, fibers) to interact with one another or with the proppant particles, or by settling of the emulsion droplets onto the proppant surface. Such other particles may be present in the fracturing fluids of the disclosure at much lower concentrations (for example, up to about 1.2 g/L (10 ppt), for example, up to about 0.6 g/L) than in conventional fracturing treatments, in order to avoid plugging issues and to provide far-field delivery. Also, the precipitation of material triggered by emulsion inversion results in aggregates formation, which provides heterogeneous proppant placement. Dissolved polymers or other materials included into emulsion may be degradable, for example, hydrolysable (for example, polylactic acid, polyglycolic acid, or copolymers thereof), polyanhydrides, polydioxanones, polycaprolactones, or fat-soluble polymers (for example, those soluble in bitumen or vegetable oil). Suitable materials include polyglycolides, polylactides, polycaprolactones, polytrimethylene carbonates, polyhydroxybutyrates, polyhydroxyvalerates, polydioxanones, polyorthoesters, polycarbonates, polytyrosinecarbonates, polyorthocarbonates, polyalkylene oxalates, polyalkylene succinates, polymaleic acids, polymaleic anhydrides, polypeptides, polydepsipeptides, polyvinyl alcohol, polyesteramides, polyamides, polyanhydrides, polyurethanes, polyphosphazenes, polycyanoacrylates, polyfumarates, polyamino acids, modified polysaccharides, modified proteins and their copolymers, terpolymers or combinations or mixtures or polymer blends thereof. Many of exemplified emulsions are commercially available. The following degradation or dissolution of emulsified or previously emulsified material provides clean wells and a high retained permeability. Although there are advantages to the materials being degradable in an emulsion, for method performance is also high for nondegradable emulsions.

We describe here a technology that allows the creation and propping of far-field fracture areas having complex geometry, which are difficult to be filled with the ordinary proppant. The main problems of far-field hydraulic fracturing are discussed in [K. D. Mahrer, A review and perspective on far-field hydraulic fracture geometry studies, J. Petr. Sci. Eng., No. 24, 1999, 13-28]. Until now, the main ways of addressing far-field hydraulic fracturing problems have been the use of low-viscosity fluids, along with choosing low concentrations of solid particles, and the use of high rates in slurry pumping. Both ordinary and unconventional proppants have been of great interest. The use of smaller proppant particle sizes (for example, sand of the size less than about 35 U.S. mesh (about 0.25 mm), or less than about 100 U.S. mesh (about 0.15 mm) can provide deeper proppant delivery into a fracture network, but the particle settling rate can be undesirably high because of using low-viscosity fluids, for example, fluids with viscosity below 37 cP at the shear rate of 170 $\sec^{-1}$ and a temperature of 21° C., are used for delivery to extended fractures.

We describe here the improvements in the delivery and placement, for example, heterogeneous placement, of proppant and other particles using emulsions of a treatment material, for example, added via on-the-fly process. The treatment material is optionally degradable under formation conditions. High concentrations of emulsified polymers have previously been proposed to slow the settling of proppant-fiber slurries in conventional hydraulic fracturing operations in which the fiber concentrations are typically from about 2.4 to about 4.8 g/L (20 to 40 ppt) with fracturing fluids have ordinary viscosities (at least about 50 cP). However, this approach does not work for very low concentrations of fibers and low-viscosity fluids typically used for far-field fracture areas. This is because, at high concentrations, the forced inversion of emulsion occurs; this is accompanied with polymer precipitation occurring in the entire fluid volume and producing viscous slurry further reinforced by a high content of fiber. Such thick slurry prevents the further pumping, especially to a far field fracture area. Such high concentrations of emulsified polymers in conventional proppant/fiber slurries may potentially be used for other purposes: for near-wellbore plugging or for proppant suspension. On the other hand, with the polymer emulsion system of the present disclosure, no polymer precipitation is observed and the fluid viscosities do not change noticeably. Even in the case of bitumen emulsions, bitumen merely precipitates on the proppant (for example, mica particles) surface, so the slurry remains medium-viscous and is able to be easily delivered into the well.

The Application [WO2010021563 A1, 2010] describes the use of mica particles as proppant for creation of extended hydraulic fractures. The planar geometry and low sedimentation of mica particles facilitate their far-field fracture delivery. Though known methods for delivery of the fine-mesh proppant are characterised by a reduced settling rate, still the low viscosity of fracturing fluid does not allow to deliver proppant into branched fractures. This disclosure offers a method for improving proppant transport properties through proppant surface modification using emulsified materials.

A method of using an emulsion to reduce the settling rate of the proppant/fiber slurry is known from [WO2010087733 A1, 2010]. The known source presents intervals for a high concentration of emulsified polymer for noticeable reduction in the settling of conventional proppant (fractures characterised by the size, geometry, and high viscosity of the fracturing fluid), wherein the concentration of dispersed fibers in the slurry is 20-40 ppt. This concentration of fibers is too high for many practical hydraulic fracturing problems.

The composition as well as methods for making and using the composition produced from a polymeric acid precursor at least partially dissolved within a dispersing solvent that may be one phase of an emulsion, are described in the Application [WO2008062332 A2, 2008]. For example, the application discloses a method of treating a formation penetrated through a wellbore, including a solid polymeric acid precursor at least partially dissolving in a dispersing solvent to form a polymeric acid precursor/solvent solution, optionally combining the polymeric acid precursor/solvent solution with a substantially immiscible fluid to form an emulsion, and introducing the solution or emulsion into the formation. Different variants of composition are used to to deliver the acid to the well.

Emulsions of hydrolysable polymers have been used in wellbore treatment operations, when a hydrolysable polymer, a viscosifier, and an organic solvent for the polymer are contained in the internal phase of the emulsion. Then, the emulsion decomposes in a controllable way under the well temperature and pressure conditions and produces droplets of polymer that then alter the formation mineral surfaces. The positive effect of the treatment arises when the emulsified polymer undergoes hydrolysis. In the method of the present discolsure, the internal phase of the emulsion does not contain a polymer solvent or a viscosifier, and, in case of a degradable polymer, the treatment material performs its function before it degrades, i.e., the treatment material is less than by 50 percent, or even less than by 80 percent degraded before the treatment is completed.

The Applicant calls attention to the fact that he already mentioned the LANDY PLA emulsion in the patent application [WO2013070585 A1, 2013]. The PLA emulsions used for coatings and medical patches are commercially available under the trade designations LANDY PL-1000 (5 microns), LANDY PL-2000 (2 microns), and LANDY PL-3000 (1 micron) from Miyoshi Oil & Fat Co., Ltd. Different kinds of LANDY PLA emulsions are used as waterproof coatings and heat-inducing patches [http://www.jbpaweb.net/english/e-gp-products6-700.htm]; however, there are no available data on the use of PLA emulsions for downhole applications; the above application does not use PLA emulsions for downhole wells, but uses them as a means for preparation of macroparticles employed in a downhole well.

The patent application [US20070298977 A1, 2007] describes methods for producing degradable particles at a drilling site, and methods of using such degradable particles in subterranean operations. The methods of use include incorporating the degradable particles into the fracturing fluids or gravel packing fluids and then allowing degradation to occur with formation of voids in the proppant or gravel packs. In other variants, the degradation of particles creates a breaker for the viscous fluid. Also, a portion of the degradable particles may be used as a diverting agent, a fluid loss control additive, or it may be used in cements. The method comprises the preparation of a mixture of a degradable polymer and the first solvent, then adding the degradable mixture to the second solvent with a sufficient shear to form an emulsion at the wellsite. Then the sufficient amount of the first solvent is removed from the discontinuous phase, so that degradable particles begin to form, which creates dispersion of solid particles in the continuous phase. At the intermediate emulsion stage, the emulsion formation is regulated by adding of surfactants. The method of forming the intermediate emulsion may be used to prepare the emulsion of the present discslore. In the present disclosure, the treatment material of emulsion is dissolved.

Some information sources describe, for example, heterogeneous placement of solid (proppant) particles under downhole conditions: [US20080135242 A1, 2008; WO2008068645 A1, 2008; PCT/RU 2006/000026; WO2007086771 A1, 2007; EP1977079 A1, 2008; U.S. Pat. No. 6,776,235 B1, 2004; WO2004009956 A1, 2004; EP1527255 A1, 2005; U.S. Pat. No. 7,451,812 A1, 2008]. The patent [GB2433067 A, 2007] describes self-aggregation based on treating the proppant with an amine and a triphosphate ester which react to coat the proppant surface or a portion of the surface, leading to an agglomeration propensity; the composition is used for the coating of the proppant or of formation surfaces during well operations. Another example: when the proppant is delivered into a fracture, the premature settling of the proppant or segregation of two-component proppant mixtures during pumping may be undesirable. The patent [U.S. Pat. No. 7,261,157 A1, 2006] teaches a method of preventing the segregation of two different types of proppant in one slurry involving the operation mixing an aqueous tackifying composition with the fracturing fluid; creating a slurry by dispersing particles of two different types into the mixture; and placing the slurry into a subterranean formation. This procedure mitigates the undesirable separation of solid particles during slurry pumping to a wellbore. The tackifying composition is used not in the emulsion form. The related patent [U.S. Pat. No. 7,178, 596 A1, 2005] discloses a method of delivering the proppant mixed with the degradable material by using proppant particles coated with a tackifying agent. This allows the degradable material particles to become at least temporarily attached to the proppant particles so as to avoid the substantial segregation of the degradable material from the proppant particles within the slurry. The resulting slurry is then pumped into the fracture, whereupon the proppant and degradable material particles form a uniform pack. Neither the tackifying material nor the degradable material is in the form of an emulsion.

The use of emulsions in well operations is well known in this field. For example, emulsions may be used as a component of a drilling fluid, because emulsion droplets ensure the better upward transport of particles produced during drilling operations. Emulsions are also used to increase fluid viscosities and for near-wellbore treatments.

A combination of taking of fine-mesh (or coarse) proppant and on-the-fly proppant surface modification with emulsified degradable materials decreases proppant settling rates in a slurry, thus providing improved proppant delivery to far-field fracture areas and also providing heterogeneous proppant placement via proppant aggregation. The proppant may be, for example, ordinary proppant, quartz powder, silicon oxide, zeolite, talc, mica, or other fine-mesh solid material easily transportable by the carrier fluid far into the fracture. The proppant particles may optionally be hydrophobic or hydrophilic and may optionally be treated chemically to provide such properties. The maximum proppant particle size is less than 0.5 mm, also from 0.1 to 0.25 mm The proppant particles have a specific gravity less than 3,800 kg/m$^3$, also less than about 3,000 kg/m$^3$; particularly suitable proppant is lightweight proppant, for example, having a specific gravity less than about 2,000 kg/m$^3$. In some cases, the proppant particles are plate-like (a typical example is mica particles). In particular, the use of mica is described in the patent application [PCT/RU2008/000566]. Mica particles are particularly useful as a proppant for far-field fractures; the mica particle shape and consequent settling properties allow better proppant delivery into a fracture. The emulsion for use in the disclosed method may contain a polymer or another material in emulsified form (with or without solvent). The emulsion interacts with the surface of the proppant particles or other particles with or without emulsion inversion. The inversion may occur due to the contact of the emulsion with the proppant surface or due to temperature, shear, or chemical triggering. Chemical triggers may be pumped before, during, and/or after emulsion injection. The enhanced transport (that is, the slow settling rate of slurry) of the proppant resulting from the adsorption of polymer or other material (for example, bitumen or vegetable oil) droplets onto the proppant surface allows better proppant delivery deep into a fracture, thus providing the treatment of a far-field fracture area (for example, more than 30 m from the wellbore). In addition, enhanced transport may be caused by interaction of other particles (for example, fibers) with the proppant particles or by adsorption of emulsion droplets onto the proppant surface, which further prevents the slurry from settling. Such other particles may be present in the fluid at much lower concentrations (for example, from about 0 to about 1.2 g/L (10 ppt)) than in conventional hydraulic fracturing operations, to avoid plugging issues and to provide far-field delivery. Also, the adsorption of emulsion droplets can result in the formation of large particle aggregates providing heterogeneous proppant placement in a hydraulic fracture. The polymer or another material included into emulsion may be degradable under downhole conditions, for example, hydrolysable (for example, polyesters, polyanhydrides, and other polymers) or oil-soluble (for example, bitumens, waxes, fatty organic acids, vaseline, tar, or vegetable oil). The degradation or dissolution of emulsified or previously emulsified material provides a clean well and high retained permeability of a proppant pack.

The emulsion is a two-phase system that has droplets of one fluid (discontinuous/internal phase) dispersed in a continuous phase (external phase) of another fluid. The droplets may be stabilized with surface-active agents (surfactants) which prevent the droplets from coalescing and prevent phase separation. If the continuous phase is water, the discontinuous phase most often includes an organic solvent, which in turn, may carry a dissolved or partially dissolved polymer or other substances.

Breaking the surface-active agent layer between the two phases via chemical interaction or by physical impact (triggering events) results in breaking the emulsion, so the discontinuous phase (including the organic solvent, polymer, surface active compound, or other compounds) may precipitate onto available contact surface, such as the surface of a proppant or other particles. However, emulsion droplet precipitation onto the solid particle surface may occur without triggering event, simply due to affinity of the particle surface to the emulsified droplets.

The emulsion droplets size is in the range from about 1 micron up to the size of the proppant particles (for example, about 0.25 mm, as in the examples below).

A suitable concentration of the dissolved polymer or another material in the discontinuous phase of emulsion is from above zero to 90 weight percent; the concentration is from 5 to 70 weight percent. A suitable concentration of the discontinuous phase of emulsion to be added to the carrier fluid is from 20 to 95 percent, for example, from 50 to 90 volume percent. The final concentration of the discontinuous phase in the carrier fluid is from 0.1 to 50 weight percent, for example, from 0.2 to 2 weight percent. The proppant concentration in the slurry is dictated by hydraulic fracturing job design, and it is typically up to 8 ppa, for example, less than 2 ppa. The concentration of the proppant in the carrier fluid may be such that the final concentration in the fracture results in less than one monolayer in the hydraulic fracture. A suitable concentration of optional fibers added is up to 10 ppt; when the proppant is mica, the fiber concentration is from 4 to 6 ppt. A suitable viscosity range for the slurry is from 1 to 40 cP (about $10^{-3}$ to $4*10^{-2}$ Pa*s) (at a shear rate of 170 sec$^{-1}$), for example, from 1 to 20 cP ($10^{-3}$ to $2*10^{-2}$ Pa*s) (at 170 sec$^{-1}$). The continuous phase may contain, for example, a linear guar gel, a crosslinked gel, a solution of water-soluble polymer (for example, polyacrylamide), and a viscoelastic surface active compound and may contain foam and/or saturated with gas.

A particularly useful method of forming the final slurry for injection, including the proppant and water-based emulsion droplets, and the dissolved treatment material droplets (the discontinuous phase) is the metering of an emulsion, for example, a bitumen emulsion or a polylactic acid emulsion, into the fracturing fluid to create the final slurry (the emulsion with water as the external phase is easily diluted by the fracturing fluid on-the-fly).

Described below are several possible modes of interaction between the emulsion droplets and the proppant particles that result in reducing the proppant settling rate in the slurry (by control of the interaction of the proppant solid particles and the emulsion droplets), which is the principal goal of the present disclosure.

1. Emulsion Inversion with the Emulsified Polymer Precipitation onto the Proppant Surface The interaction of proppant and emulsion can produce the partial or complete coating of the proppant surface with emulsified material (for example, polymer, bitumen, etc.) after emulsion inversion. The coating of the particle surface 1 with the precipitated polymer 2 (or another material available in the emulsion droplets) that has an affinity to the proppant surface (as shown schematically in FIG. 1 for the situation of partial coverage with material) results in a drastic change in the particle settling/transport properties and thus reduces the settling rate. For example, the interaction between bitumen emulsion and mica surface results from the attraction between the charged particles (for example, mica particles carrying a negative charge) and the emulsion droplets having the opposite charge (bitumen droplets are stabilized with cationic surfactant). This results in bitumen precipitation onto the surface of mica platelets. The emulsions droplets and the proppant particles can be selected and modified to promote affinity.

Figure 2:
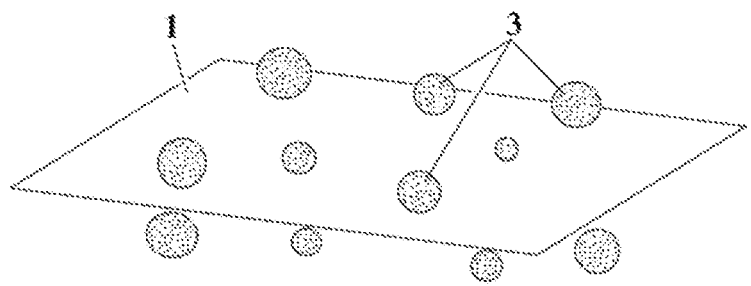
FIG. 2 shows a plate-like proppant particle partially coated with the emulsion droplets absorbed on the surface.

2. Sorption of the Emulsion Droplets on the Proppant Surface without Emulsion Inversion The same increase in particle transport performance may occur without emulsion inversion, due to the adsorption of small-size emulsion droplets 3 onto the proppant surface 1 (as shown schematically in FIG. 2). When emulsion droplets attach to the proppant surface, this partial coating makes the effective density of the new conglomerate lower for the proppant particle alone, and this decreases the settling rate of the particles.

Figure 3:
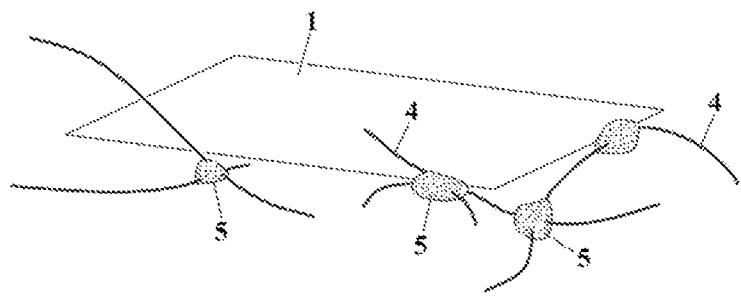
FIG. 3 shows fibers and a plate-like proppant particle partially coated with a polymer or other material with affinity to dispersed fibers, precipitated from destabilized emulsion droplets.

3. Bonding of Fibers to the Proppant Particles by the Emulsified Material to Prevent Proppant Settling In the case of a system of proppant particles and dispersed polymeric fibers, the addition of emulsion in this slurry may induce the interaction between proppant particles and fibers. FIG. 3 illustrates this triple system schematically: sticky polymer micelles 5 (the result of inverted emulsion) create strong adhesion between the fiber 4, which induces a random mesh-like structure, involving the fibers and the product of the inverted emulsion, which holds up the suspended proppant particles.

EXAMPLES

The present disclosure can be further understood from the following examples.

Example 1

Figure 4:
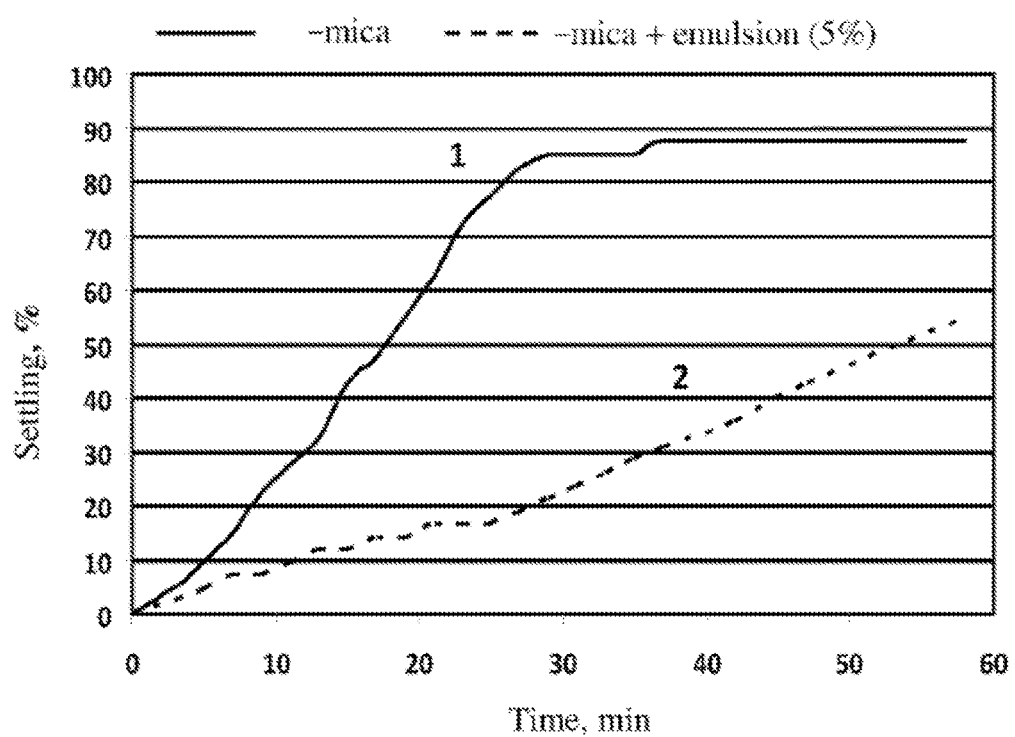
FIG. 4 compares the settling rates of mica particles in an aqueous medium and mica particles through water-based emulsion of polylactic acid.

A reference sample slurry was prepared with 50 ml of water viscosified with guar (2.4 g/L (20 ppt) of guar) and 120 g/L (1 ppa) of mica proppant particles (6 g of ground mica with particles having an average size less than 0.25 mm for 50 ml of gel). The viscosity of the slurry was 22 cP at 170 sec$^{-1}$. The commercial muscovite mica, obtained from Minelco Specialties Limited, UK, was used; the thickness of the mica particles was about 20-25 microns. The manufacturer described the material as dry-ground, highly delaminated potassium aluminium silicate muscovite mica flakes having a melting point of about 1,300° C., a specific gravity of about 2.8, a pH of about 9, as a 10 weight percent slurry in water, and as being flexible, elastic, tough, and having a high aspect ratio. The MD250 particle size distribution was as follows: 99.9% smaller than 250 microns, 10-50% smaller than 125 microns, and 0-15% smaller than 63 microns. The water-based slurry studied was made with 50 ml of the same guar gel as the reference sample premixed with 5 volume percent of a polylactic acid (PLA) emulsion (2.5 ml, LANDY PL-1000, obtained from Miyoshi Oil & Fat Co., Ltd., Tokyo, Japan). The mica powder (120 g/L (1 ppa)) was added and stirred intensively with an overhead mixer until a uniform state of slurry was obtained. The adding of 5 volume percent of the emulsion did not change the viscosity of the guar fluid. These two samples of the slurry were simultaneously placed into two 50 ml graduated glass cylinders, and the clear fluid volume formed above the proppant was measured as a function of time. The settling was calculated according to the equation:

$$\text{Settling percent} = V_{cf} \times \frac{100}{V_t - V_{100}},$$

where $V_t$ is the total volume of slurry, $V_{100}$ is the volume occupied by the proppant after complete settling (measured by placing the dry proppant into a measurement cylinder without the slurry), and $V_{cf}$ is the volume of the clear fluid above the settled proppant. The test accuracy was better than ±5%. Solid curve 1 in FIG. 4 shows the settling of the mica particles in a water-based gel. Dotted curve 2 in FIG. 4 shows the settling of mica slurry in the same gel with the addition of 5 volume percent of the PLA emulsion. The proppant in the pure gel (without emulsion) completely settled in 30 min; the settling in the second glass cylinder (with the emulsion added) was at the level of 56% in 60 min. Thus, this type of slurry can be delivered to a greater distance into a fracture with less settling of the proppant particles. The reference sample had a settling rate of particles too high for long-time delivery into far-field zones of fractures.

Example 2

Figure 5:
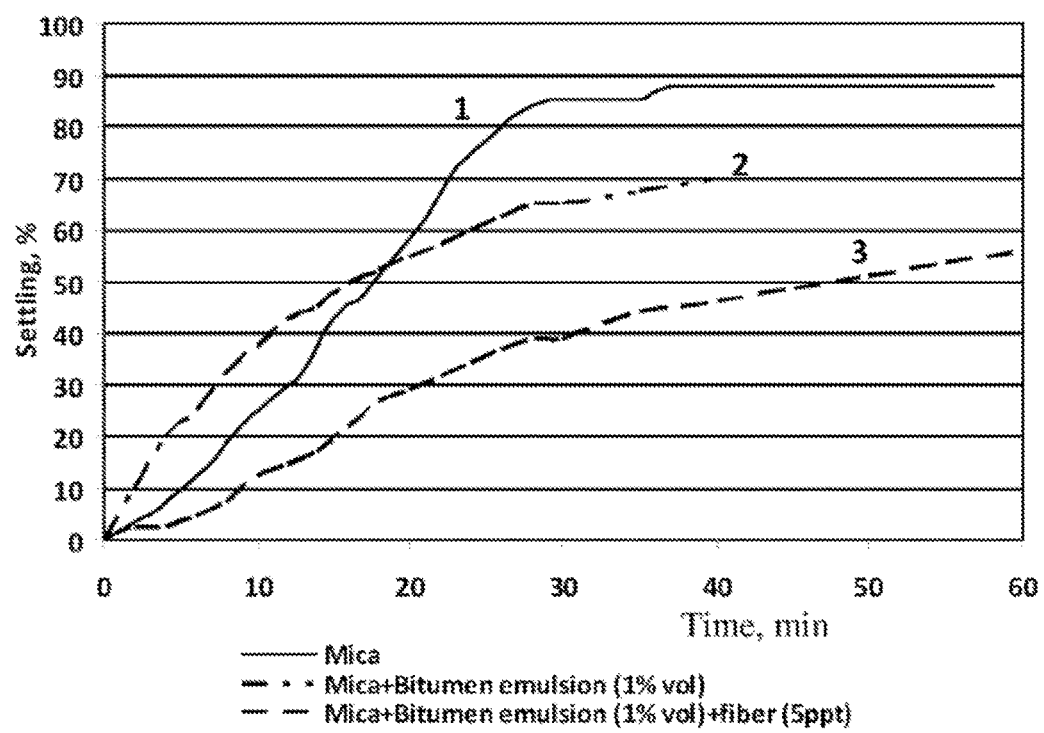
FIG. 5 compares the settling rates of mica particles in pure aqueous medium, mica particles in a bitumen emulsion, and mica particles and fibers dispersed in a bitumen emulsion.

The slurry reference sample (curve 1 in FIG. 5) was prepared with 50 ml of water viscosified with guar (2.4 g/L (20 ppt) of guar) and 0.12 kg/L (1 ppa) of the mica proppant particles (6 g MD250 plates having an average size less than about 250 microns). The water-based slurry plotted as curve 2 in FIG. 5 was made with 50 ml of the same gel premixed with 1 volume percent of a bitumen emulsion (0.5 ml, commercially available stabilized cationic emulsion BEC-2 from SibAvtoBan, Ltd., Russia) and 0.12 kg/L (1 ppa) of the same mica particles. The BES-2 emulsion is stabilized with a cationic surfactant and this is the oil-in-water type emulsion and contains 60% of bitumen. The water-based slurry shown in curve 3 of FIG. 5 was made with 50 ml of the same gel premixed with 1 volume percent of the same bitumen emulsion, 0.12 kg/L (1 ppa) of the same mica, and a low concentration of 0.6 g/L (5 ppt) (30 mg in 50 ml) of polymer (PLA) fibers. The fluids were again prepared by intensive stirring with an overhead mixer. Tests like those of Example 1 were run. The emulsion added in small amounts cannot change the slurry viscosity (depends mainly by concentration of linear guar gel). It can be seen from this plotting that the mica slurry with an added bitumen emulsion has the settling rate lower than for the slurry without emulsion, and the sample of mica slurry with added fibers and bitumen emulsion has very low settling rate. A further increase (up to 5 volume percent) in the concentration of the bitumen-based emulsion in the gel did not produce additional benefits in the settling rate.

In Example 2, emulsion inversion took place due to the charges on the mica and/or fiber particles. The commercial bitumen emulsion was stabilized by a cationic surfactant. The contact of emulsion droplets with the fibers and/or mica particles resulted in bitumen droplet precipitation onto the mica surface. Under field conditions, oil production will gradually dissolve the pumped bitumen (in emulsion or precipitate form) and thus provide a natural clean-up of the proppant pack.

Furthermore, when an inverted emulsion produces enough tackifying material (for example, bitumen, sticky polymer, etc.), the presence of the adhesive droplets leads to the occurrence of proppant agglomerates with open fluid channels between them, thus providing heterogeneous proppant placement.

Emulsion inversion (also known as emulsion triggering) may also be achieved by other methods known in the area, for example, a change in the temperature, addition of triggering agents, contact with structured highly developed surfaces, for example, those having high pores surface, etc. Suitable triggering agents depend on how the emulsion has been stabilized. Suitable triggering agents may be surface-active agents (cationic, anionic, non-ionic), mutual solvents such as 2-butoxyethanol, acetone, methylethylketone, and methanol, multivalent cations such as $Ca^{2+}$, $Mg^{2+}$, and the like, and anions such as carbonates and silicates. The triggering agent for the bitumen emulsion may be, for example, a mica surface, bicarbonate and carbonate ions. For LANDY PLA emulsions, 2-butoxyethanol as a triggering agent is particularly useful. Thus, upon increasing the emulsion concentration in Example 2 from 1 to 3 and then to 5 volume percent, the aggregation of mica particles was observed. The mica slurry lost its uniform distribution, and particles agglomerated into pillars of about 0.5 cm in size, leaving free-fluid channels between the dense pillars. If this process were to be carried out in a fracture, it would produce proppant pillars (for example, comprising flocculated mica particles) in the hydraulic fracture and would result in a high-conductivity heterogeneous proppant pack.

Although various embodiments have been described with respect to enabling disclosures, it is to be understood that this document is not limited to the disclosed embodiments. Variations and modifications that would occur to one of skill in the art upon reading the specification are also within the scope of the disclosure, which is defined in the appended claims.

We claim:

1. A method of modification of a proppant having a surface during well operations, comprising:
    emulsifying a treatment material to produce a water emulsion in which an internal phase contains droplets of the treatment material;
    forming a proppant slurry comprising the proppant, the emulsion and a carrier fluid;
    injecting the formed proppant slurry through a well into a formation during a hydraulic fracturing operation and/or a creation of gravel packing in the well; and
    using a chemical trigger to break the water emulsion, causing the internal phase of the emulsion to precipitate onto the proppant surface.

2. The method of claim 1, wherein the treatment material has a specific gravity that is lower than that of the proppant.

3. The method of claim 1, wherein the proppant has a maximum particle size of about 0.5 mm.

4. The method of claim 1, wherein the proppant comprises ceramic proppant, resin-coated proppant, sand, silicon oxide, zeolite, talc, mica or fly ash.

5. The method of claim 1 or 4, wherein the proppant comprises a plate-like material.

6. The method of claim 1, wherein the proppant is a hydrophobic or a hydrophilic material.

7. The method of claim 1, wherein the proppant surface is hydrophobically or hydrophilically modified.

8. The method of claim 1, wherein the proppant is present in the slurry at a concentration that results in a partial monolayer coverage in a fracture.

9. The method of claim 1, wherein the carrier fluid may contain, a linear guar gel, a crosslinked gel, a solution of a water-soluble polymer or a viscoelastic surface active compound.

10. The method of claim 1, wherein the carrier fluid comprises a foam or is saturated with gas.

11. The method of claim 1, wherein a concentration of the emulsified treatment material in the carrier fluid is less than about 10 weight percent.

12. The method of claim 1, wherein the treatment material is a polymeric acid precursor.

13. The method of claim 1, wherein the treatment material is degradable in the formation.

14. The method of claim 1, wherein the emulsion comprises a degradable polymer.

15. The method of claim 1, wherein the emulsion contains an oil-soluble material that comprises bitumens, waxes, fatty organic acids, vaseline, tar, or vegetable oil.

16. The method of claim 1, wherein the carrier fluid comprises fibers.

17. The method of claim 1, wherein the droplets of the treatment material carry a first charge that is opposite to a second charge carried by the proppant particles or a modified surface of the proppant.

18. The method of claim 1, wherein the emulsion of the treatment material is formed at a wellsite.

19. The method of claim 1, wherein the slurry is formed by adding the water emulsion of the treatment material on-the-fly.

20. The method of claim 1, wherein the droplets of the treatment material interact with the surface of the proppant or other particles.

21. The method of claim 1, wherein the breaking of the emulsion internal phase is triggered.

22. The method of claim 1, wherein a chemical trigger breaks the emulsion before, during or after the injection of the water emulsion.

23. The method of claim 1, wherein an average emulsion droplet size is within a range from about 1 micron to about the size of the proppant.

24. The method of claim 1, wherein the water emulsion is stabilized.

25. A method for proppant delivery into a subterranean formation, comprising:
    modifying a proppant surface during the well operations according to claim 1; and
    injecting the formed proppant slurry according to claim 1 through the well into the formation at a pressure and a fracturing fluid flow rate sufficient to provide delivery of the proppant into a hydraulic fracture or during gravel packing in the wellbore or both.

26. The method of claim 25, wherein heterogeneous proppant placement in a hydraulic fracture is carried out.

27. A method of hydraulic fracturing in a well having a subterranean formation, comprising:
    emulsifying a treatment material to produce a water-based emulsion in which the treatment material is dissolved in an internal phase;
    forming a proppant slurry including a proppant, the emulsion, and a carrier fluid;
    injecting the formed proppant slurry through the well into the subterranean formation;
    creating or expanding at least one hydraulic fracture by placing a fracturing fluid in the subterranean formation; and using a chemical trigger to break the water-based emulsion, causing the internal phase of the emulsion to precipitate onto a proppant surface.

28. The method of claim 27, wherein heterogeneous proppant placement in the hydraulic fracture is carried out.

29. A method for gravel packing a wellbore, comprising:
emulsifying a treatment material to produce a water emulsion in which the treatment material is dissolved in an internal phase;
forming a proppant slurry including a proppant, the water emulsion and a carrier fluid;
injecting the formed proppant slurry through the wellbore to form a gravel pack; and
using a chemical trigger to break the water emulsion, causing the internal phase of the emulsion to precipitate onto the proppant surface.

30. The method of claim 29, wherein the slurry is injected through a directional or horizontal well.

* * * * *